F. C. ATHERTON.
DRIVING AND BRAKING MECHANISM.
APPLICATION FILED APR. 23, 1909. RENEWED JULY 30, 1912.
1,055,012.
Patented Mar. 4, 1913.
2 SHEETS—SHEET 2.
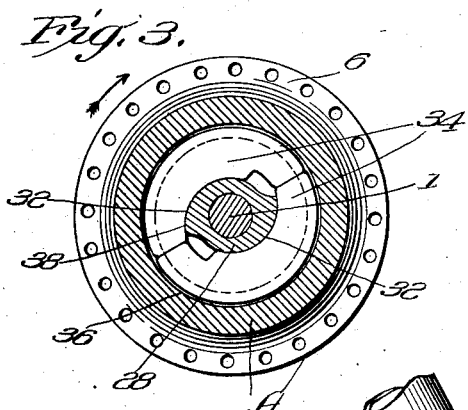
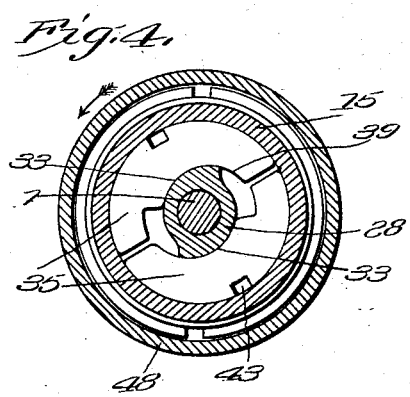
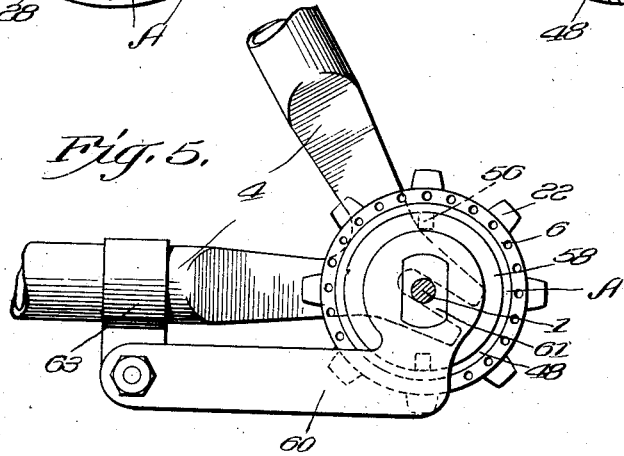
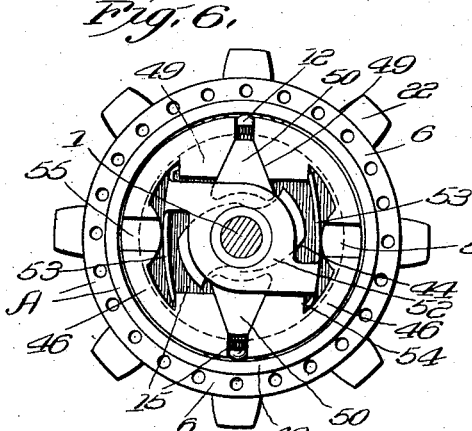
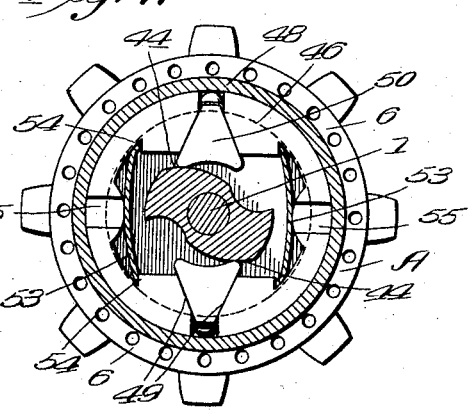
Witnesses:
Inventor
Fisher C. Atherton
By his Attorney

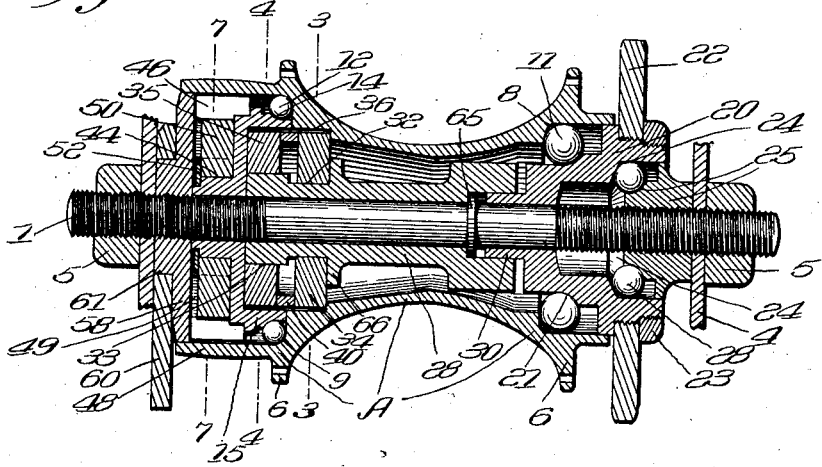

UNITED STATES PATENT OFFICE.

FISHER C. ATHERTON, OF BUFFALO, NEW YORK.

DRIVING AND BRAKING MECHANISM.

1,055,012. Specification of Letters Patent. Patented Mar. 4, 1913.

Application filed April 23, 1909, Serial No. 491,825. Renewed July 30, 1912. Serial No. 712,296.

*To all whom it may concern:*

Be it known that I, FISHER C. ATHERTON, citizen of the United States, residing at Buffalo, in the county of Erie and State of New York, have invented new and useful Improvements in Driving and Braking Mechanism, of which the following is a specification.

My invention relates to a driving and braking mechanism for wheels and consists of a wheel-hub of the type commonly known as "coaster-brakes" and particularly adapted for bicycles, in which on the forward rotation of the sprocket wheel a clutch is thrown into engagement to cause a similar rotation of the wheel-hub, while a reverse rotation of the sprocket-wheel operates a suitable brake to cause a braking of the hub, and adapted when the sprocket wheel is at rest to permit the wheel-hub to revolve freely on its bearings. To accomplish this I have devised a coaster-brake as hereinafter described, having particularly in view the production of an improved brake of simple and compact construction which will be reliable and effective in its operation, quickly responsive and with the least possible wear or strain upon the parts. These and other advantages of my improved brake will be readily understood by reference to the accompanying drawings in which the numerals of the description indicate corresponding parts in all the views.

In the drawings Figure 1 is a vertical longitudinal section of a coaster-brake employing my invention. Fig. 2 is an elevation thereof with the hub-barrel shown in section. Figs. 3 and 4 are vertical cross-sectional views of my invention taken respectively on lines 3—3 and 4—4 of Fig. 1 as viewed toward the left. Fig. 5 is a side elevation of my brake as applied to a bicycle. Figs. 6 and 7 are views particularly showing my braking mechanism being respectively an end elevation of my brake with the securing arm removed and a vertical cross-sectional view on line 7—7 of Fig. 1 looking toward the right. Fig. 8 is a detail perspective view showing the wedge-segments and retaining ring therefor.

In the figures, 1 indicates the usual stationary axle or spindle for the wheel-hub, rigidly supported, for instance in the rear forks or frame members 4 of a bicycle as shown, and fixed in position by the securing nuts 5—5 arranged on either end of the axle. Journaled to rotate on the axle is the usual wheel-hub A comprising a suitable hub-barrel, forming a casing for the driving and braking mechanism, having the integral spoke-rings 6—6, and at either end, bearings for the hub; the right hand bearing providing the internal cup-cone or ball-race 8 and the left bearing a similar ball-race 9. Arranged in the ball-races 8 and 9 between the hub-bearings and coöperating bearing cones carried on the axle, the usual series of anti-friction balls 11 and 12 are interposed. As shown, the left hand cone 14, arranged to coöperate with the left hand hub bearing, is formed on the brake-actuating sleeve 15 loosely journaled on the axle. To form a similar coöperating cone for the right hub bearing, the sprocket member 20, loosely journaled on the axle, is provided with the external conical portion 21 arranged to retain between it and the right hub-bearing the balls 11 as aforesaid. This driving member has fixed thereon the usual driving-sprocket 22 secured in position by nut 23, and is also provided with an internal cup-cone or ball-race 24 forming a bearing for the drive member, between which and the cone 25, threaded on to the right end of the axle, anti-friction balls 27 are interposed. As will be seen the hub-barrel A is thus free to revolve independently on its bearings 11 and 12 which is normally the case, that is, when the sprocket-member 20 is at rest. However when the sprocket-member is rotated by means of the sprocket thereon, means are provided to co-act therewith, whereby on the forward rotation, the hub-barrel will be locked to the sprocket-member to be driven thereby, while, on the reverse rotation, a suitable brake mechanism is actuated to retard or stop the rotation of the hub. This is accomplished by the action of a cam-sleeve 28 journaled on the axle and connected to be operated by the drive member by being fitted to the squared end 30 of said member; the cam-sleeve being provided with reversely arranged eccentric cam-surfaces 32 and 33 as best illustrated in Figs. 3 and 4. Against the respective cam-surfaces are held the propelling wedge-segments 34 and brake-actuating wedge-segments 35, arranged in pairs and provided with inner eccentric bearing surfaces 38 and 39 for the respective cam-surfaces, whereby on forward or reverse rotation of the sleeve the cam-surfaces operate respectively to force the propelling-segments or the brake-actuating segments outwardly into engagement to operate as a clutch to propel or to actuate a retarding brake for the hub-barrel. To accomplish the former, that is to propel the hub on the forward rotation of the sprocket-wheel and cam-sleeve, the propelling-segments 34 are arranged to be then forced into engagement with the inner peripheral bearing surface 36 of the hub-barrel thus positively locking the cam-sleeve to the wheel-hub to rotate together.

To maintain the relation of the segments a retaining ring 40 is interposed between the respective propelling and brake-actuating segments, provided with oppositely arranged lugs 41 engaging suitable notches 43 in the wedge segments as best shown in Fig. 8 whereby the segments are secured to rotate together on the rotation of the sleeve; the segment notches being adapted to permit the necessary movement of the segments with relation to the cam-surfaces.

To operate the braking mechanism, which is an important part of my invention, the brake-actuating-segments are adapted to be forced outwardly by their cam-surfaces into engagement with the inner periphery of the flanged brake-actuating-sleeve 15, on the reverse movement of the sprocket-wheel, thus locking the driving sleeve 28 to the brake-sleeve whereby they will be rotated together—the brake-actuating sleeve having cam-portions 44 adapted to throw into operation a braking means now to be described. As best shown in Figs. 6 and 7, this braking means consists of oppositely arranged brake-pieces or shoes 46 surrounding the cam-portions 44 and adapted to be forced outwardly by the action of said cam-portions to produce a retarding friction between their outer contact surfaces and the inner peripheral surface of the laterally extending flange 48 of the hub-barrel; the brake-pieces are provided with adjacent beveled ends 49 between which are arranged the spreading-wedge pieces 50 as shown, interposed between the cam portions 44 and the brake-pieces and engaged by the former to cause the expanding of the brake-pieces on the reverse rotation of the sprocket to effect the braking of the hub as best shown in Fig. 7. To insure the retracting or return of the brake-pieces into normal position on the release of the braking action of the sprocket-wheel, the wedges 50 as shown are formed to be engaged by the cams only at one of the inner corners thereof, and, further to insure said return of the brake-pieces, spring-piece 52 is provided with opposite integral springs 53 with their tips in engagement with small shoulder 54 of the brake-pieces, tending to retract said brake-pieces to their normal positions. To secure the brake-pieces to prevent rotation thereof, whereby they offer braking resistance to the hub when in frictional engagement therewith, the brake-pieces are provided with opposite recesses 55 to which are fitted suitable engaging lugs 56 of the stationary end-plate 58, held stationary by the retaining arm 60, fitted to the squared shoulder 61, provided for its application on the plate 58, and secured at its upper end to a suitable hanger 63 fixed on the frame. Small collar 65 on the axle is provided to assist in securing the parts in assembled position as shown in Fig. 1, the said collar engaging the drive-sleeve 28 which in turn has provided thereon a collar or shoulder 66 to secure the segments in position.

The operation of my improved mechanism is as follows:—On the forward revolution of the sprocket the driving sleeve 28 is rotated by the sprocket member to cause the propelling-segments to be forced outwardly by the cam-surfaces 32 whereby their outer concentric surfaces engage the inner periphery of the hub-bearing 36, locking the driving sleeve thereto so that on further forward rotation of the sleeve a similar propelling movement is imparted to the hub-barrel. The segments are retained in said locking position during said forward rotation. When the sprocket wheel is held at rest, the wedge-segments will recede, being then permitted to ride down the cam-surfaces, releasing the hub to "coast", that is to rotate on the roller-bearings 11 and 12 independent of the driving or propelling means. As best illustrated in Figs. 4, 6 and 7 a reverse or rearward movement of the sprocket-wheel (as indicated by the arrow, Fig. 4) operates to throw into action the brake-actuating segments 35 by reason of the cam-surfaces 33 acting thereon, forcing them outwardly whereby their outer concentric surfaces engage the inner periphery of the brake sleeve, locking the driving-sleeve and brake-sleeve to rotate together. A further reverse movement will rotate the brake-sleeve to force outwardly the brake-expanding-wedges 50, by the engagement therewith of its cams 44, throwing the brake pieces into frictional braking engagement with the hub-barrel, the extent of said frictional engagement being governed by the pressure applied on the reverse of the sprocket wheel.

I have thus produced a simple device for the purpose described having comparatively few parts, the parts being so formed and arranged that the greatest compactness is secured, and which may be easily assembled, is quickly responsive on either forward rotation of the sprocket to propel the hub or on the reverse rotation to set the brake, and which will be positive in its operation while reducing the idle movement, required to throw the different parts into action, to the minimum. This construction permits the location of the braking-surface and braking means outside of the hub-bearings, which gives convenient access thereto, is easy to assemble and economical in manufacture. Furthermore my invention is particularly adapted to be used with the desirable "concave" hub having a small center.

Having thus described my invention, what I claim and desire to secure by Letters Patent is:—

1. In a driving and braking mechanism for wheels, the combination with the hub and the axle, of brake-members suitably arranged to be expanded into braking contact with the hub, brake-expanding wedges interposed between the brake-members to spread said members into braking contact upon being separated, a sprocket member suitably journaled and means operated by the sprocket member to cause the separation of the wedges upon the reverse rotation thereof.

2. In a coaster-brake, the combination with the hub and the axle, of a sprocket-member journaled on the axle, an actuating-sleeve journaled on the axle and connected with the sprocket-member to rotate therewith, said sleeve being provided with opposite eccentric surfaces, a brake-operating sleeve provided with radially acting brake actuating cams, a braking means operated by said cams on the rotation of the brake-operating sleeve in one direction and clutch-members interposed between the sleeve-accentric and brake-actuating sleeve operative to secure said sleeves to rotate together on the reverse rotation of the sprocket-member.

3. In a coaster-brake the combination with the hub and the axle, of brake-members suitably arranged to be expanded into braking contact with the hub, brake-expanding wedges interposed between the brake-members to spread said members into braking contact upon being separated, spring pieces normally to retain the brake-members together and to return them when released by the wedges, a sprocket-member suitably journaled and means operated by the sprocket-member to cause the separation of the wedges upon the reverse rotation thereof.

4. In a coaster-brake the combination with the hub and the axle, of an operating sleeve journaled on the axle, and provided with opposite eccentric surfaces, a brake-sleeve suitably journaled and provided with a third set of eccentric surfaces, means operated by one set of the operating eccentrics on the rotation thereof in one direction to cause a similar rotation of the hub, means operated by the opposite eccentrics on the reverse rotation to cause a similar rotation of the brake-sleeve, a sprocket member rotatably connected to the operating sleeve and a braking means operated by the brake-sleeve eccentrics to cause the braking of the hub.

5. In a coaster-brake the combination with the hub and the axle, of brake-segments suitably arranged to be expanded into braking contact with the hub, and provided with oppositely arranged guide-slots, a fixed retaining plate having lugs fitted to said segment-slots to secure the segments against rotation, said segments having their adjacent ends beveled, brake-expanding wedges to expand the brake-segments interposed between said beveled ends, a brake-actuating sleeve suitably journaled and provided with opposite radially acting cam surfaces to engage the wedges to cause expanding of the brake-members, spring-pieces normally to retain the segments together and to return them to their initial position upon being released by the wedges, a sprocket-member suitably journaled, and connections between the sprocket-member and brake-actuating sleeve, whereby they are secured to rotate together to produce a braking pressure.

6. In a driving and braking mechanism for wheels, the combination with the hub and the axle, of a driving sleeve suitably journaled, a cam-sleeve rotatably connected to the drive-sleeve, said cam-sleeve being formed on the opposite end from the drive-sleeve with reverse eccentrics, driving segments fitted to the eccentrics operative on the forward rotation of the drive-sleeve to be operated thereby to engage the hub, brake-segments fitted to the eccentrics operative on the reverse rotation of the drive-sleeve, brake-members arranged to be expanded into braking contact with the hub, brake-expanding wedges interposed between the brake-members to spread said members into braking contact upon being separated, a brake-actuating sleeve suitably journaled and provided with cam surfaces to cause the separation of the expanding wedges upon being rotated, said brake-actuating sleeve having a laterally extending flange surrounding the brake-segments to be engaged thereby to secure the said sleeve to the drive-sleeve on the reverse rotation of the drive-sleeve to operate the brake.

7. In a driving and braking mechanism for wheels, the combination with the hub and the axle, of a driving-member journaled on the axle, a brake-operating sleeve provided with radially acting cam surfaces, a braking means operated by said cam surfaces on the oscillation of the sleeve in one direction, means to secure the driving-member and the hub to rotate together on the forward rotation of said member and means to impart the reverse movement of the driving-member to the said sleeve to operate the brake.

8. In a coaster-brake, the combination with the hub and the axle, of brake members suitably arranged to be expanded into braking contact with the hub, oppositely arranged brake expanding wedges to expand the brake members upon being separated, a brake-actuating sleeve suitably journaled and provided with radially acting cam surfaces to separate the wedges to cause expanding of the brake members, a driving member suitably journaled and connections between the driving member and brake actuating sleeve whereby they are secured to rotate together to produce a braking pressure.

In testimony whereof I have signed my name to this specification in the presence of two subscribing witnesses.

FISHER C. ATHERTON.

Witnesses:
 CARRIE S. BROWN,
 CAROLINE A. HEDGE.

Copies of this patent may be obtained for five cents each, by addressing the "Commissioner of Patents, Washington, D. C."